United States Patent
Youngberg et al.

(10) Patent No.: US 11,651,084 B2
(45) Date of Patent: *May 16, 2023

(54) METHODS AND SYSTEMS FOR DETERMINING SOFTWARE RISK SCORES

(71) Applicant: Capital One Services, LLC, McLean, VA (US)

(72) Inventors: Adam James Youngberg, Allen, TX (US); David Filbey, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/208,658

(22) Filed: Mar. 22, 2021

(65) Prior Publication Data

US 2021/0256138 A1 Aug. 19, 2021

Related U.S. Application Data

(63) Continuation of application No. 16/593,412, filed on Oct. 4, 2019, now Pat. No. 10,956,579, which is a continuation of application No. 16/177,275, filed on Oct. 31, 2018, now Pat. No. 10,467,419.

(51) Int. Cl.
*G06F 21/57* (2013.01)
*G06F 21/55* (2013.01)
*G06F 21/56* (2013.01)

(52) U.S. Cl.
CPC .......... *G06F 21/577* (2013.01); *G06F 21/552* (2013.01); *G06F 21/563* (2013.01); *G06F 21/566* (2013.01)

(58) Field of Classification Search
CPC .... G06F 21/577; G06F 21/552; G06F 21/563; G06F 21/566
See application file for complete search history.

(56) References Cited

U.S. PATENT DOCUMENTS

| | | | |
|---|---|---|---|
| 9,418,230 B2 | 8/2016 | Archer et al. | |
| 9,800,606 B1 * | 10/2017 | Yumer | H04L 63/1425 |
| 10,116,681 B2 | 10/2018 | Cornell et al. | |
| 10,140,453 B1 * | 11/2018 | Fridakis | G06F 21/577 |

(Continued)

FOREIGN PATENT DOCUMENTS

WO 2016018289 A1 2/2016

*Primary Examiner* — Aravind K Moorthy
(74) *Attorney, Agent, or Firm* — Troutman Pepper Hamilton Sanders LLP; Christopher J. Forstner; John A. Morrissett

(57) ABSTRACT

A system for assessing software risks includes a non-transitory computer readable medium and a processor. The non-transitory computer readable medium stores category risk scores based on findings generated by software security analysis tools of different categories. The processor receives at least one first finding from a first category of software security analysis tools and at least one second finding from a second category of software security analysis tools. A first category risk score is computed based on the at least one first finding. A second category risk score is computed based on the at least one second finding. An overall risk score for application code is determined by computing a weighted average based on the first category risk score and the second category risk score. A graphical user interface displays the overall risk score.

20 Claims, 13 Drawing Sheets

(56) References Cited

U.S. PATENT DOCUMENTS

| | | | |
|---|---|---|---|
| 10,467,419 B1* | 11/2019 | Youngberg | G06F 21/563 |
| 10,540,493 B1* | 1/2020 | Kras | G06F 21/46 |
| 10,956,579 B2* | 3/2021 | Youngberg | G06F 21/563 |
| 2004/0221176 A1* | 11/2004 | Cole | G06F 21/577 |
| | | | 726/25 |
| 2007/0067845 A1* | 3/2007 | Wiemer | H04L 41/28 |
| | | | 726/25 |
| 2009/0024663 A1 | 1/2009 | McGovern | |
| 2009/0199264 A1* | 8/2009 | Lang | G06F 21/31 |
| | | | 726/1 |
| 2010/0205673 A1* | 8/2010 | Burrell | G06F 21/577 |
| | | | 726/25 |
| 2011/0191849 A1* | 8/2011 | Jayaraman | H04L 63/1416 |
| | | | 715/205 |
| 2012/0210434 A1* | 8/2012 | Curtis | H04L 63/0263 |
| | | | 726/25 |
| 2013/0097662 A1* | 4/2013 | Pearcy | H04L 63/20 |
| | | | 726/1 |
| 2013/0111592 A1 | 5/2013 | Zhu et al. | |
| 2013/0160124 A1* | 6/2013 | St Hlberg | G06F 21/56 |
| | | | 726/24 |
| 2013/0283336 A1* | 10/2013 | Macy | G06F 21/577 |
| | | | 726/1 |
| 2014/0366143 A1* | 12/2014 | Sandler | G06F 21/577 |
| | | | 726/25 |
| 2015/0007261 A1* | 1/2015 | Hecht | G06F 21/604 |
| | | | 726/1 |
| 2015/0215332 A1 | 7/2015 | Curcic et al. | |
| 2015/0309813 A1 | 10/2015 | Patel | |
| 2015/0373039 A1* | 12/2015 | Wang | H04L 63/1425 |
| | | | 726/23 |
| 2016/0099963 A1* | 4/2016 | Mahaffey | G06F 21/554 |
| | | | 726/25 |
| 2016/0173520 A1* | 6/2016 | Foster | G06F 21/316 |
| | | | 726/25 |
| 2016/0366167 A1* | 12/2016 | Yumer | G06F 21/50 |
| 2016/0373480 A1 | 12/2016 | Sridhar | |
| 2017/0032143 A1* | 2/2017 | Kong | G06F 21/6263 |
| 2017/0091459 A1 | 3/2017 | Childress et al. | |
| 2017/0169228 A1 | 6/2017 | Brucker et al. | |
| 2017/0230417 A1* | 8/2017 | Amar | H04L 63/08 |
| 2017/0244740 A1 | 8/2017 | Mahabir et al. | |
| 2017/0270303 A1 | 9/2017 | Roichman et al. | |
| 2018/0025154 A1 | 1/2018 | Cornell et al. | |
| 2018/0144127 A1 | 5/2018 | Duer et al. | |
| 2018/0157842 A1 | 6/2018 | Holz et al. | |
| 2018/0176245 A1 | 6/2018 | Cornell et al. | |
| 2018/0248863 A1* | 8/2018 | Kao | H04L 63/102 |
| 2018/0330102 A1 | 11/2018 | Siman et al. | |
| 2019/0020666 A1* | 1/2019 | Leung | H04L 63/0227 |
| 2019/0087821 A1* | 3/2019 | Jia | G06Q 20/4016 |
| 2019/0114435 A1* | 4/2019 | Bhalla | G06F 21/55 |
| 2019/0132350 A1* | 5/2019 | Smith | G06F 21/577 |
| 2019/0141075 A1 | 5/2019 | Gay et al. | |
| 2019/0180035 A1 | 6/2019 | Esperer et al. | |
| 2019/0180039 A1 | 6/2019 | Considine et al. | |
| 2019/0205542 A1 | 7/2019 | Kao et al. | |
| 2019/0260777 A1* | 8/2019 | Mehrotra | H04L 63/08 |
| 2019/0325145 A1 | 10/2019 | Siman et al. | |
| 2019/0347666 A1* | 11/2019 | Bermudez-Cisneros | G06F 21/31 |
| 2020/0074070 A1* | 3/2020 | Boodaei | G06F 21/33 |
| 2020/0097662 A1* | 3/2020 | Hufsmith | H04L 9/0643 |
| 2020/0099716 A1* | 3/2020 | Sjouwerman | H04L 63/1416 |

\* cited by examiner

METHODS AND SYSTEMS FOR DETERMINING SOFTWARE RISK SCORES

CROSS-REFERENCE TO RELATED APPLICATIONS

This application is a continuation of, and claims priority under 35 U.S.C. § 120 to, U.S. patent application Ser. No. 16/593,412, filed Oct. 4, 2019, which will issue as U.S. Pat. No. 10,956,579 on Mar. 23, 2021, which is a continuation of U.S. patent application Ser. No. 16/177,275, filed Oct. 31, 2018, now U.S. Pat. No. 10,467,419, the entire contents of each of which are incorporated fully herein by reference.

This disclosure incorporates by reference U.S. patent application Ser. No. 16/177,178, filed Oct. 31, 2018, entitled "Methods and Systems for Multi-tool Orchestration", U.S. patent application Ser. No. 16/177,236, filed Oct. 31, 2018, entitled "Methods and Systems for Reducing False Positive Findings," U.S. patent application Ser. No. 16/177,299, filed Oct. 31, 2018, entitled "Methods and Systems for De-duplication of Findings," the contents of which are incorporated by reference herein as if they were restated in full.

FIELD

The presently disclosed subject matter relates generally to assessing software risks based on software security analysis findings produced by multiple software security analysis tools, more particularly, to systems and methods that determine risk scores based on findings generated by multiple software security analysis tools.

BACKGROUND

Traditionally, understanding application risk as a result of performing multiple tests using different categories of tools, such as Static Application Security Testing (SAST) tools, Dynamic Application Security Testing (DAST) tools, and Interactive Software Security Testing (IAST) tools, is quite challenging as these tools provide different metrics. These metrics are static and do not account for risks associated with stale findings. For instance, these metrics do not account for the advent of newly identified vulnerabilities or improved scanning techniques after scan has completed. Some existing technology evaluates risk within a given category of tools, without considering other categories of tools. Some existing technology does not account for adjustments of risk scores post scanning due to time-based, or other factors.

In view of the foregoing, a need exists for a scoring solution that computes software risks by considering tests performed by multiple categories of software security testing tools, and provides a normalized score scale despite metric differences among different categories of tools. Further, there is a need to adjust scores over time to account for additional risks that may occur after scan has completed.

SUMMARY

Aspects of the disclosed technology include systems and methods for numerically assessing software risks, such as security risks, of application code of a software project based on software security analysis findings generated by multiple software security analysis tools that perform scan on the application code. These tools may span across different categories, such as SAST, DAST, IAST and Open Source Analysis (OSA) tools. The disclosed system may compute a category risk score based on findings generated by tools of each category. For instance, the disclosed system may compute a first category risk score, such as a static vulnerability score, based on findings generated by SAST tools. Similarly, the disclosed system may compute a second category risk score, such as a dynamic vulnerability score, based on findings generated by DAST tools. Likewise, the disclosed system may derive another category risk score, such as an interactive vulnerability score, based on findings generated by IAST tools. The disclosed system may derive two category risk scores from OSA tools, including an open source vulnerability score and an open source license score. To assess the total risk of the application code, the disclosed system may determine an overall risk score by computing a weighted average of category risk scores.

To take into account of risks that may happen after scan, the disclosed system may update the overall risk score for the application code over time based on frequency of scan performed by each category of software security analysis tools, age of findings, and frequency of findings review.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 11 is an example screenshot of a graphical user interface of the risk assessment system according to one aspect of the disclosed technology.

FIG. 13 is an additional example screenshot of the graphical user interface of the risk assessment system according to one aspect of the disclosed technology.

DETAILED DESCRIPTION

Figure 1:
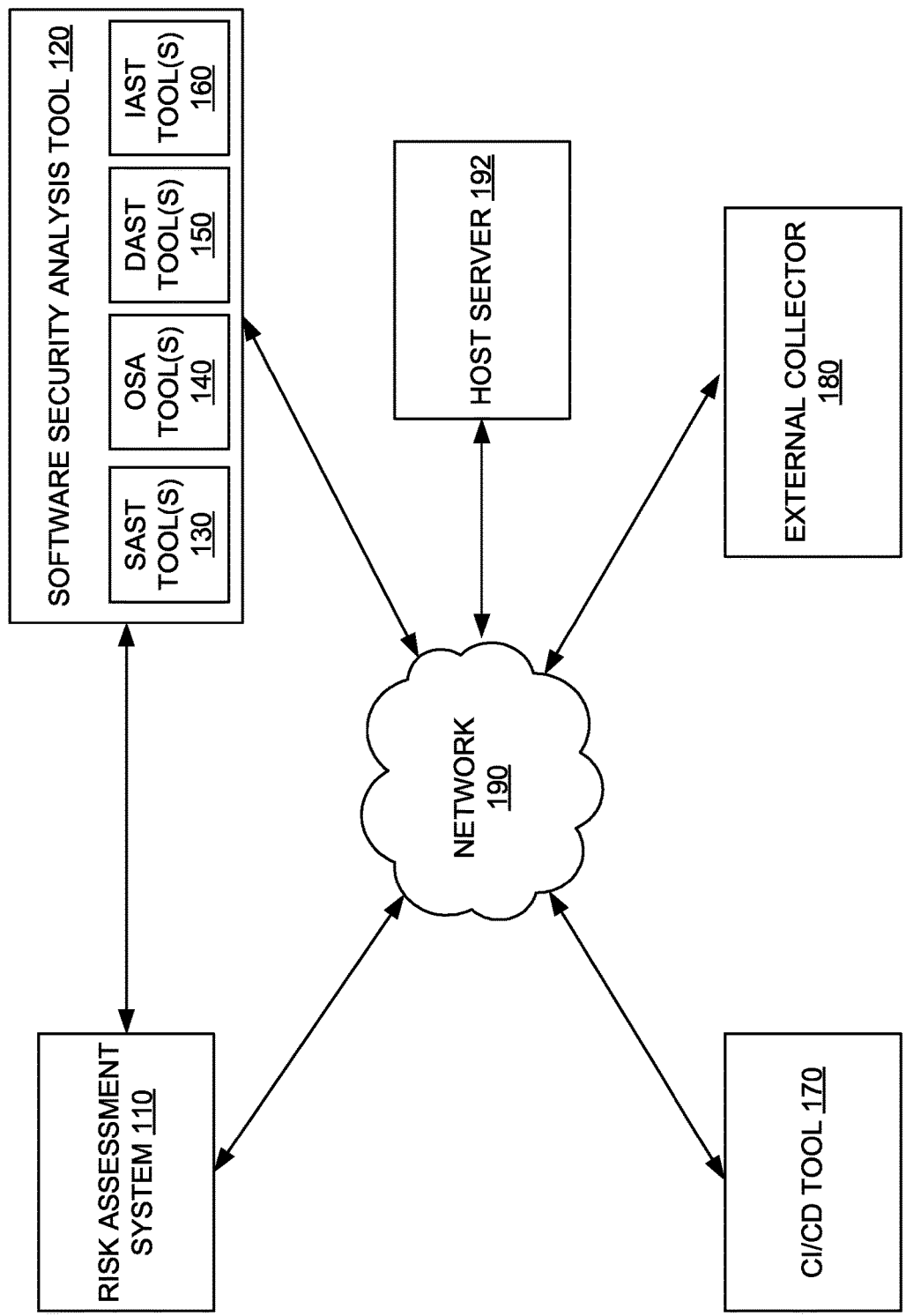
FIG. 1 is a diagram of an example environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Consistent with the disclosed embodiments, a system for assessing software risks includes a non-transitory computer readable medium and a processor. The non-transitory computer readable medium stores category risk scores based on software security analysis findings generated by software security analysis tools of different categories. The processor is configured to receive at least one first finding from a first category of software security analysis tools that perform scans of application code. The processor computes a first category risk score based on the at least one first finding. The processor receives at least one second finding from a second category of software security analysis tools that perform scans of the application code. The processor computes a second category risk score based on the at least one second finding. The processor determines an overall risk score for the application code by computing a weighted average based on the first category risk score and the second category risk score. The processor displays the overall risk score on a graphical user interface.

In one embodiment, the first software security analysis tool and the second software security analysis tool belong to at least one of the following categories: a first category for performing SAST, and a second category for performing OSA, a third category for performing DAST, and a fourth category for performing IAST. Other software security analysis tools or tool categories may also be implemented.

In one embodiment, the first software security analysis tool and the second software security analysis tool belong to different categories.

In one embodiment, the first category risk score and the second category risk score each distinctly represent one of the following: static vulnerability score, open source vulnerability score, open source license score, dynamic vulnerability score and interactive vulnerability score.

In one embodiment, the processor is configured to receive at least one third finding from the second category of software security analysis tools. The processor computes a third category risk score based on the at least one third finding. The processor determines the overall risk score for the application code by computing the weighted average based on the first category risk score, the second category risk score and the third category risk score.

In one embodiment, the processor is configured to update the overall risk score for the application code over time based at least on one of the following: frequency of scan performed by each category of software security analysis tools, age of findings, and frequency of findings review.

In one embodiment, each finding is associated with a risk level of a plurality of different risk levels. Each risk level is associated with a unique deduction score for computing the category risk score. Findings of the same risk level have the same deduction score.

In one embodiment, at least one risk level has a maximum deduction threshold, such that once the maximum deduction threshold is met, further findings of the same risk level are disregarded for computing the category risk score.

In one embodiment, the processor is configured to receive at least one fourth finding from the first category of software security analysis tools. The processor determines whether to update the first category risk score based on the fourth finding. The processor updates the overall risk score when the first category risk score is updated.

In one embodiment, the fourth finding and the first finding are generated by different software security analysis tools of the first category.

In one embodiment, the fourth finding and the first finding are generated by the same software security analysis tool of the first category.

In one embodiment, the fourth finding and the first finding are generated in different scan sessions.

In one embodiment, the fourth finding and the first finding are generated during the same scan session.

In one embodiment, the processor determines to maintain the first category risk score without update when the fourth finding duplicates the first finding.

In one embodiment, the processor determines to maintain the first category risk score without update when the fourth finding and the first finding are of the same risk level. The maximum deduction threshold for the risk level has been met.

In one embodiment, each software security analysis tool is a standalone solution, a network-based client-server solution, a web-based solution, or a cloud-based solution.

Another aspect of the disclosed technology relates to a system for assessing software risks. The system includes a non-transitory computer readable medium and a processor. The non-transitory computer readable medium stores category risk scores based on findings generated by software security analysis tools of different categories. The processor is configured to receive at least one first finding from at least one SAST tool that performs a scan of application code. The processor computes a static vulnerability score based on the at least one first finding. The processor receives at least one second finding and at least one third finding from at least one OSA tool that performs a scan of the application code. The processor computes an open source vulnerability score based on the at least one second finding. The processor computes an open source license score based on the at least one third finding. The processor determines an overall risk score for the application code by computing a weighted average based on the static vulnerability score, the open source vulnerability score, and the open source license score. The processor displays the overall risk score for the application code on a graphical user interface.

In one embodiment, the processor is configured to update the overall risk score for the application code over time based at least on one of the following: frequency of scan performed by each category of software security analysis tools, age of findings, and frequency of findings review.

A further aspect of the disclosed technology relates to a system for assessing software risks. The system includes a non-transitory computer readable medium and a processor. The non-transitory computer readable medium stores category risk scores based on findings generated by software security analysis tools of different categories. The processor is configured to receive at least one first finding from at least one SAST tool that performs a scan of application code. The processor computes a static vulnerability score based on the at least one first finding. The processor receives at least one second finding and at least one third finding from at least one OSA tool that performs a scan of the application code. The processor computes an open source vulnerability score based on the at least one second finding. The processor computes an open source license score based on the at least one third finding. The processor receives at least one fourth finding from at least one DAST tool that performs a scan of the application code. The processor computes a dynamic vulnerability score based on the at least one fourth finding. The processor determines an overall risk score for the application code by computing a weighted average based on the static vulnerability score, the open source vulnerability score, the open source license score, and the dynamic vulnerability score. The processor displays the overall risk score for the application code on a graphical user interface.

In one embodiment, wherein the processor is configured to update the overall risk score for the application code over time based at least on one of the following: frequency of scan performed by each category of software security analysis tools, age of findings, and frequency of findings review.

Consistent with the disclosed embodiments, methods for determining risk scores based on findings generated by multiple software security analysis tools are disclosed.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations, the environment 100 may include one or more of the following: one or more risk assessment systems 110, one or more software security analysis tools 120, one or more continuous integration, continuous delivery (CI/CD) tools 170, one or more external collectors 180, one or more networks 190, and one or more host servers 192.

The software security analysis tools 120 may include one or more categories, such as a first category of one or more SAST tools 130, a second category of one or more OSA tools 140, a third category of one or more DAST tools 150, and a fourth category of one or more IAST tools 160 among other possibilities.

Each software security analysis tool 120 of the first, second, third and fourth categories may be a standalone solution, a network-based client-server solution, a web-based solution, or a cloud-based solution, among other possibilities. Each software security analysis tool 120 may be provided by a different licensor or vendor, and thus each may be independent of each other. The SAST tools 130 may include Checkmarx™ and Fortify™, among other possibilities. The OSA tools 140 may include WhiteSource™ and Blackduck™, among other possibilities. The DAST tools 150 may include WebInspect™ and Contrast™, among other possibilities. The IAST tools 160 may include Veracode™ and WhiteHat™, among other possibilities.

For application code of each software project, the risk assessment system 110 may calculate category risk scores for each category of tools 120 that perform a scan of the application code. In particular, for application code of each software project, the risk assessment system 110 may determine a category risk score based on findings generated by the same category of tools 120. For example, the risk assessment system 110 may determine a static vulnerability score based on findings generated by one or more SAST tools 130, an open source vulnerability score and an open source license score based on findings generated by one or more OSA tools 140, a dynamic vulnerability score based on findings generated by one or more DAST tools 150, and an interactive vulnerability score based on findings generated by one or more IAST tools 160. If only one tool 120 of a given category is used to perform a scan of application code, that the category risk score for that specific category is based on findings of that tool alone. If multiple tools 120 of a given category are used to perform a scan of the application code, then the category risk score for that specific category is based on findings of all tools of that specific category.

Each category risk score may be a numeric score. Each category risk score may be normalized to a 100-point scale, among other possibilities. Each category risk score may take into account multiple scans performed by tools of the same category. Each category risk score may take into account multiple scans performed during the same scan session or at different scan sessions.

The risk assessment system 110 may compute an overall risk score across multiple categories of scans. The overall risk score may represent a total risk assessment by taking into consideration of each category risk score, such that software owner may have an increased understanding of software security posture. The overall risk score may be a numeric score. The overall risk score may be on a 100-point scale. The risk assessment system 110 may compute the overall risk score by computing a weighted average of various category risk scores. For instance, the overall risk score may be determined by computing a weighted average of at least two of the following category risk scores: static vulnerability score, open source vulnerability score, open source license score, dynamic vulnerability score, and interactive vulnerability score. Weights or weighting factors assigned to category risk scores are configurable. In one embodiment, each category risk score may be assigned with the same weight. In another embodiment, category risk scores may be given different weights based on risk appetite. For instance, for a bank software project, open source license score may be given a higher weight than static vulnerability score, as the open source license findings may represent a greater risk than static vulnerability findings. In one embodiment, the risk assessment system 110 may compute the overall risk score based on three category risk scores, including static vulnerability score with a 25% weight, open source vulnerability score with a 25% weight, and open source license score with a 50% weight.

To help software owners or developers gain a better understanding of security state of software projects over time, the risk assessment system 110 may adjust risk scores over time to account for additional risks subsequent to scan. The risk assessment system 110 may perform adjustments of category risk scores over time and/or overall risk score based on one or more of the following: frequency of scan performed by each category of software security analysis tools 120, age of specific findings, and frequency of findings review. The overall risk score may be recomputed and adjusted accordingly as category risk scores are adjusted. The overall risk score may not only indicate risks based on findings, but also reflect use of the tools 120.

For instance, if scans have not been performed frequently on application code of a software project, or no review has been performed on the software project recently, the risk assessment system 110 may not have information recent vulnerabilities, resulting in increased security risks. As a result, the risk assessment system 110 may adjust scores to indicate such increased security risks. For instance, if no scan has been performed on application code of the software project by any tools 120 for a month, the risk assessment system 110 may reduce the overall risk score by 10 points from a score of 80 to a score of 70.

Based on the overall risk score and the category risk scores, software owner or developer may determine any necessary action to address risks. For example, if the overall risk score is below a release threshold, the developer may decide not to release the software project. For instance, the overall risk score may be 75, and the release threshold may be 80. Since the overall risk score is below the release threshold, the developer may consider that it is too risky to release the software project.

Figure 2:
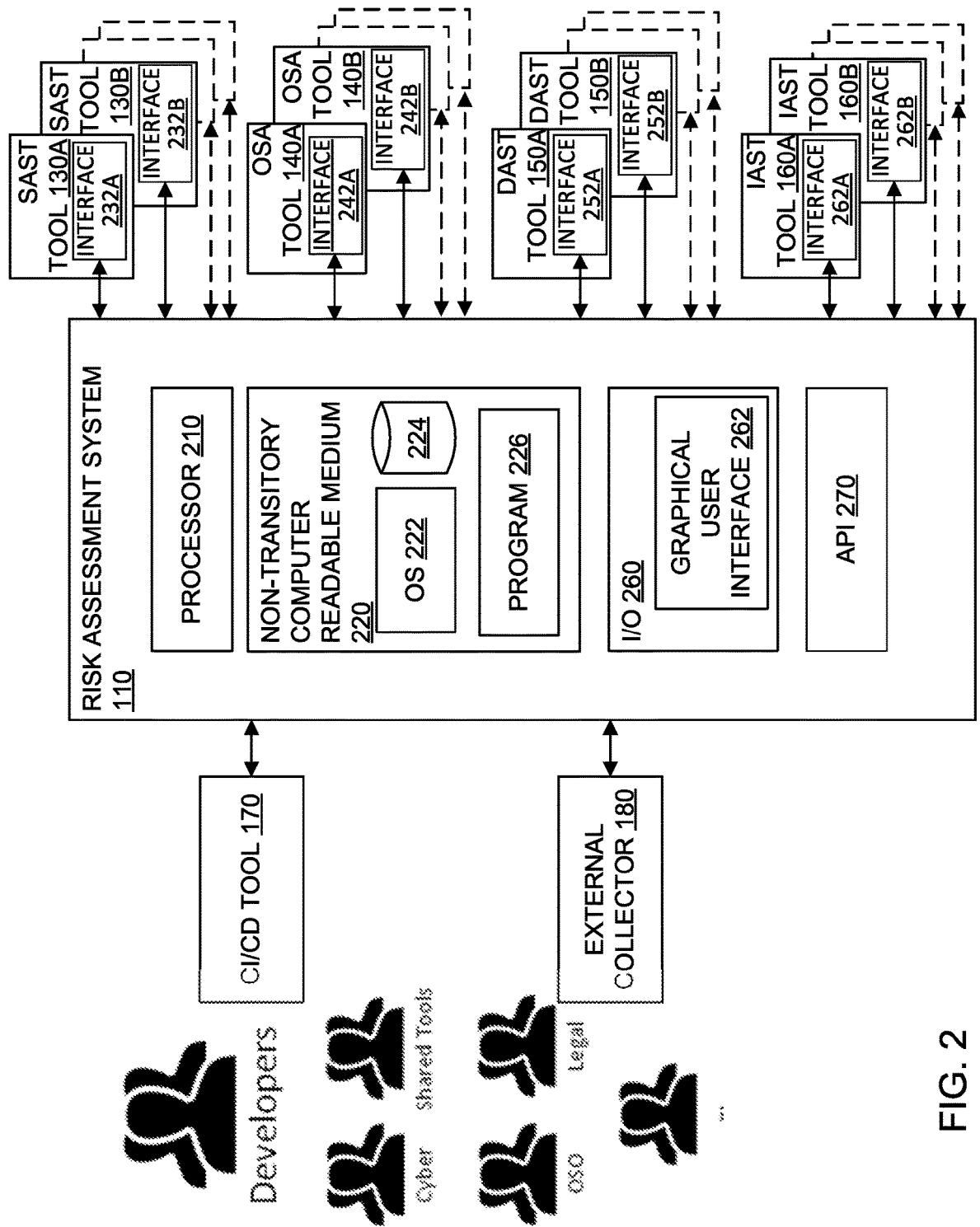
FIG. 2 is an example block diagram illustrating communications between a risk assessment system and multiple software security analysis tools according to one aspect of the disclosed technology.

Turning to FIG. 2, the risk assessment system 110 may compute risk scores across multiple categories of tools, including but not limited to, one or more SAST tools 130A-130C, one or more OSA tools 140A-140C, one or more DAST tools 150A-150C, and one or more IAST tools 160A-160C, among other possibilities.

The risk assessment system 110 may include one or more of the following: a processor 210, a non-transitory computer readable medium 220, an input/output ("I/O") device 260, and an application program interface (API) 270, among other possibilities. The I/O device 260 may include a graphical user interface 262.

The non-transitory computer readable medium 220 may store category risk scores that are determined based on findings generated by each category of tools 120. The non-transitory computer readable medium 220 may store the overall risk score for application code of each software project.

Figure 3:
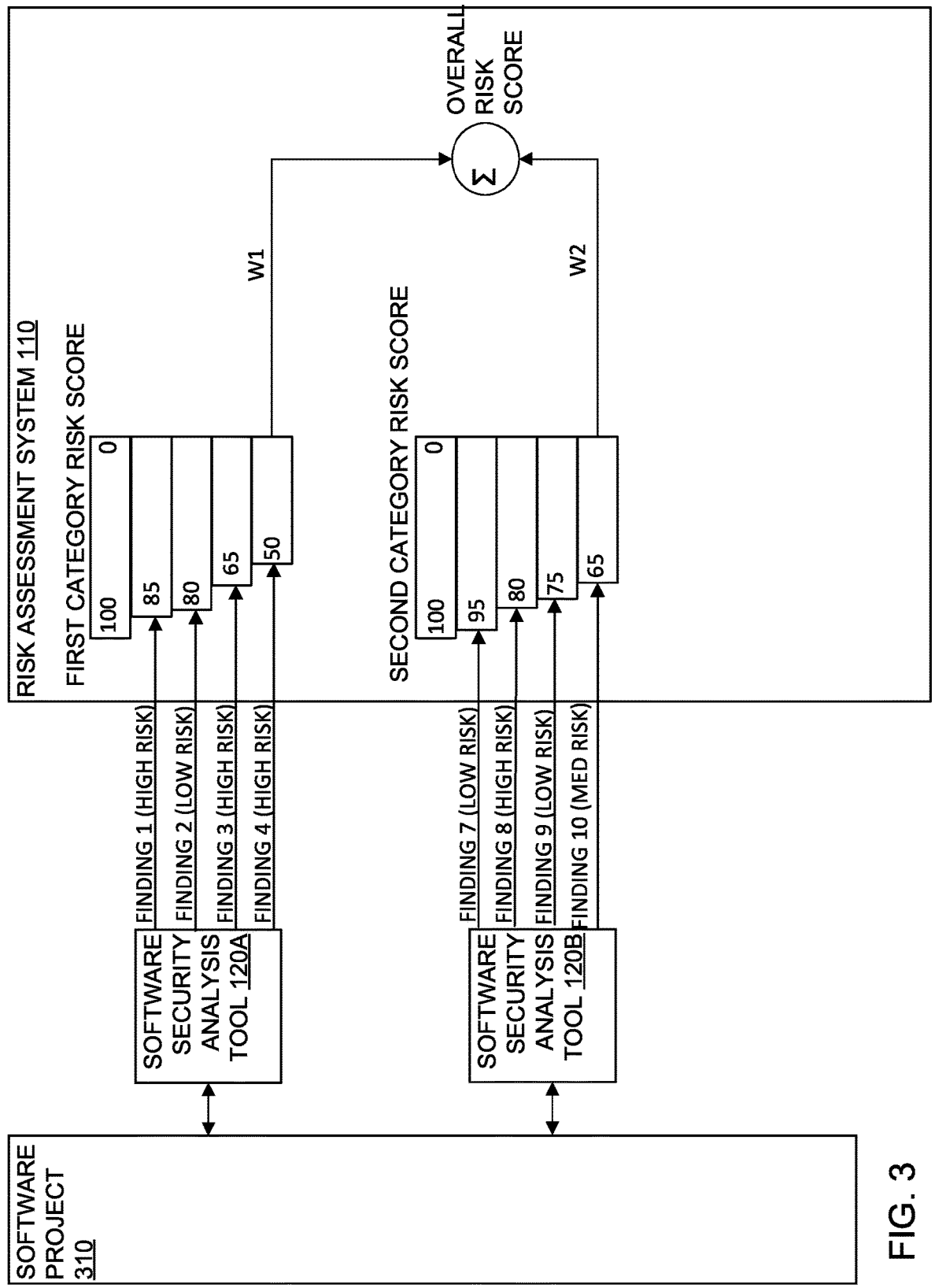
FIG. 3 is a first example block diagram illustrating a scoring process performed by the risk assessment system according to one aspect of the disclosed technology.

FIG. 3 illustrates a block diagram illustrating a scoring process performed by the risk assessment system 110. The risk assessment system 110 may instruct multiple software security analysis tools 120A and 120B to scan application code of a software project 310. The software project 310 may include a plurality of application code.

The first software security analysis tool 120A and the second software security analysis tool 120B may belong to at least one of the following categories: a first category for performing SAST, a second category for performing OSA, a third category for performing DAST, and a fourth category for performing IAST. Each tool 120A and 120B may belong to a different category. For instance, the first tool 120A may be a SAST tool, while the second tool 120B may be an OSA tool. The tools 120A and 120B may run during the same scan session or at different scan sessions.

In one embodiment, the tools 120A and 120B may be from different vendors. Each tool 120A, 120B may generate a finding at a vendor-provided format. For instance, the first tool 120A may generate findings in a first vendor-provided format, and the second tool 120B may generate findings in a second vendor-provided format. The first and second vendor-provided formats may be identical to or different from each other. In one example, findings generated by the first tool 120A may be in the format of XML, while findings generated by the second tool 120B may be in the format of JSON.

Application code of the software project 310 may include several software issues that are detectable by one or more software security analysis tools. For instance, some software issues may be detectable by the first tool 120A, while other software issues may be detectable by the second tool 120B. Each tool may generate a finding corresponding to each detectable software issue. The tools 120A and 120B may report their findings to the risk assessment system 110. For instance, the tool 120A may report findings 1-4 to the risk assessment system 110, while the tool 120B may report findings 7-10 to the risk assessment system 110.

The tools 120A and 120B may report their findings at different timestamps or different scan sessions. For instance, the first tool 120A may report at a first timestamp, and the second tool 120B may report at a second timestamp. The second timestamp may occur after the first timestamp.

As shown in FIG. 3, the risk assessment system 110 may determine a first category risk score based on findings generated by the first tool 120A, and a second category risk score based on findings generated by the second tool 120B.

The risk assessment system 110 may assign a risk level to each finding. Risk levels may include low-risk level, medium-risk level and high-risk level, among other possibilities. Each risk level may be associated with predetermined deduction points to be used for calculating or reducing the category risk score. Different risk levels may be associated with different deduction points. For instance, low-risk findings, medium-risk findings and high-risk findings may be associated with 5, 10 and 15 deduction points, respectively. Each category risk score may start with its maximum value, such as 100 points. As the risk assessment system 110 receives each finding, the risk assessment system 110 may subtract the category risk score by the deduction point associated with the finding.

As shown in FIG. 3, with respect to findings generated by the first tool 120A, findings 1, 3 and 4 are high-risk findings, each associated with 15 deduction points, whereas finding 2 is a low risk finding associated with 5 deduction points. As the risk assessment system 110 receives each finding, the risk assessment system 110 deducts the first category risk score which starts with a default score, such as 100 points, by the deduction points associated with each finding.

With respect to findings generated by the second tool 120B, findings 7 and 9 are low risk findings, each associated with 5 deduction points. Finding 8 is high risk and associated with 15 deduction points. Finding 10 is medium risk and associated with 10 deduction points. As the risk assessment system 110 receives each finding, the risk assessment system 110 deducts the second category risk score which starts with the default score, such as 100 points, by the deduction points associated with each finding.

In one embodiment, the tools 120A and 120B belong to different categories of SAST, OSA, DAST and IAST tools. The risk classification of findings for each category may be different. For instance, one category may have three risk levels such as low, medium, and high risks, while another category may have five risk levels. Deduction points used in each risk classification of findings of different categories may be different. For instance, one category may have 5, 10 and 15 deduction points assigned to low-risk level, medium-risk level and high-risk level, while another category may have 2, 4, 6, 8 and 10 deduction points assigned to five distinct risk levels.

The risk assessment system 110 may assign a first weighting factor W1 to the first category risk score, and a second weighting factor W2 to the second category risk score. The risk assessment system 110 may compute an overall risk score by computing a weighted average of the first category risk score and the second category risk score.

Figure 4:
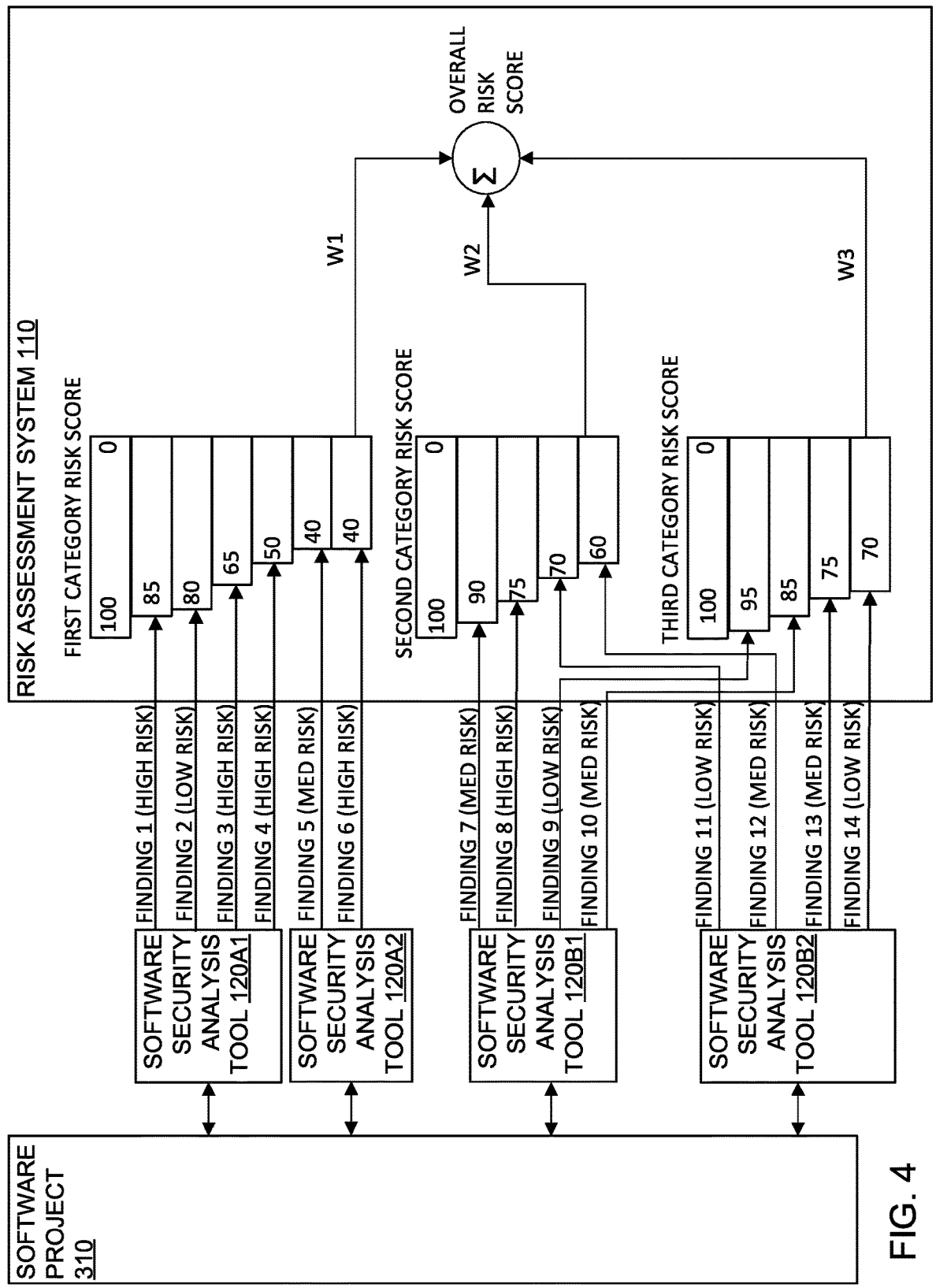
FIG. 4 is a second example block diagram illustrating a scoring process performed by the risk assessment system according to one aspect of the disclosed technology.

FIG. 4 illustrates a block diagram illustrating another scoring process performed by the risk assessment system 110. The risk assessment system 110 may compute a first category risk score based on findings provided by software security analysis tools 120A1 and 120A2. The tools 120A1 and 120A2 may be tools belonging to the same category. In one embodiment, both tools 120A1 and 120A2 may be SAST tools. For example, the tool 120A1 may be Checkmarx™, and the tool 120A2 may be Fortify™. The first category risk score may represent a static vulnerability score that indicates a combined static analysis result.

To compute the first category risk score, as the risk assessment system 110 receives each finding, the risk assessment system 110 deducts the first category risk score, which has a default value, such as 100 points, by the deduction points associated with each finding. The risk assessment system 110 may use the same risk level classification for assigning risk levels to findings generated by tools 120A1 and 120A2.

A risk level may be associated with a maximum deduction threshold, which may be configured by the risk assessment system 110. Once the maximum deduction threshold is reached, further finding of the same risk level may be discounted for purposes of computing scores. For instance, high-risk level may be associated with a maximum deduction threshold of 45 points. Once findings of high risks have collectively reached the maximum deduction threshold, any further high-risk finding will be discounted for purposes of computing the score. As shown in FIG. 4, findings 1, 3, 4 and 6 are all high-risk findings. Once findings 1, 3 and 4 have collectively reached the maximum deduction threshold of 45 points, any further finding, such as finding 6, is discounted for computing the score. Similarly, low-risk level and medium-risk levels each may be associated with a maximum deduction threshold. The maximum deduction threshold for each risk level may be different.

The first category risk score may be continuously updated by the risk assessment system 110 as more tools which are in the same category as tools 120A1 and 120A2 generate findings. Further, the risk assessment system 110 may update the first category risk score as each tool 120A1 and 120A2 performs subsequent scans on application code of the software project 310.

Also illustrated in FIG. 4, the risk assessment system 110 may compute a second category risk score based on findings provided by software security analysis tools 120B1 and 120B2, and may compute a third category risk score also based on findings provided by software security analysis tools 120B1 and 120B2. The tools 120B1 and 120B2 may be tools of the same category. In one embodiment, the tools 120B1 and 120B2 may be OSA tools. For instance, the tool 120B1 may be WhiteSource™, and the tool 120B2 may be Blackduck™. The second category risk score may represent an open source vulnerability score that indicates a combined analysis of open source known vulnerabilities. The third category risk score may represent an open source license score that indicates a combined open source license analysis.

The open source vulnerability score may indicate risks based on the library or code of the software project, whereas the open source license score may indicate risks introduced by licensing. The open source license score is computed by considering licensing risks, such as whether the software project needs to be open sourced by virtue of the license.

The risk assessment system 110 may compute the second category risk score based on findings 7-10, and compute the third category risk score based on findings 11-14.

Similar to the first category risk score, the second category risk score and the third category risk score may be continuously updated by the risk assessment system 110 as more tools which are in the same category as tools 120B1 and 120B2 generate findings. Further, the risk assessment system 110 may update the second category risk score and the third category risk score as each tool 120B1 and 120B2 performs subsequent scans on application code of the software project 310.

The risk assessment system 110 may assign a first weighting factor W1 to the first category risk score, a second weighting factor W2 to the second category risk score, and a third weighting factor W3 to the third category risk score. The risk assessment system 110 may compute an overall risk score by computing a weighted average of the first category risk score, the second category risk score, and the third category risk score.

Figure 5:
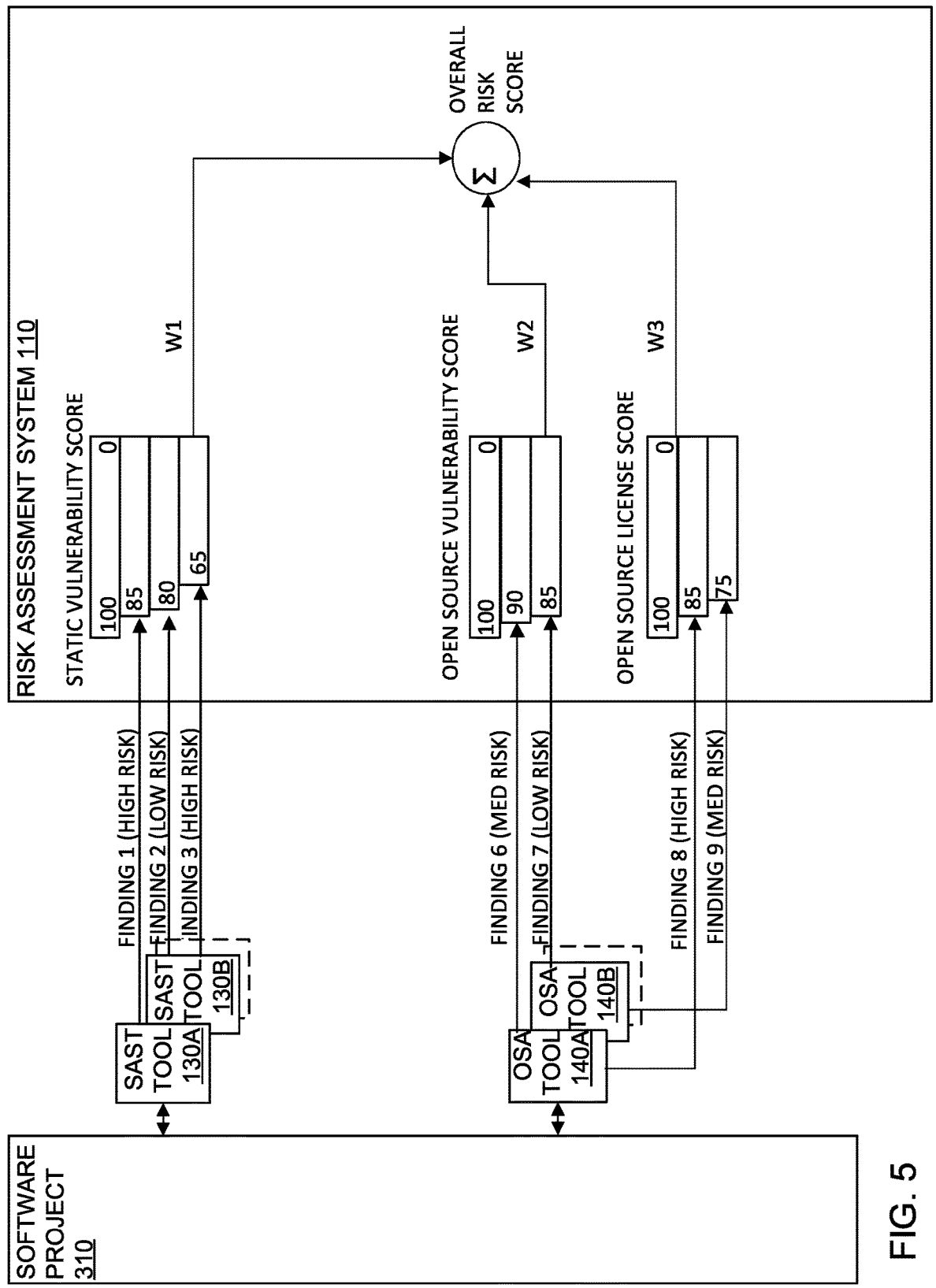
FIG. 5 is a third example block diagram illustrating a scoring process performed by the risk assessment system according to one aspect of the disclosed technology.

Turning to FIG. 5, in one embodiment, the risk assessment system 110 may compute a static vulnerability score based on findings generated by all SAST tools, including SAST tools 130A-B, that perform scans on application code of the software project 310. The risk assessment system 110 may compute an open source vulnerability score based on findings generated by all OSA tools, including OSA tools 140A-B, that perform scans on application code of the software project 310. Further, the risk assessment system 110 may compute an open source license score based on findings generated by all OSA tools, including OSA tools 140A-B. The risk assessment system 110 may assign weighting factors W1, W2 and W3 to the static vulnerability score, the open source vulnerability score, and the open source license score, respectively. The risk assessment system 110 may compute an overall risk score by computing a weighted average of the static vulnerability score, the open source vulnerability score, and the open source license score.

Figure 6:
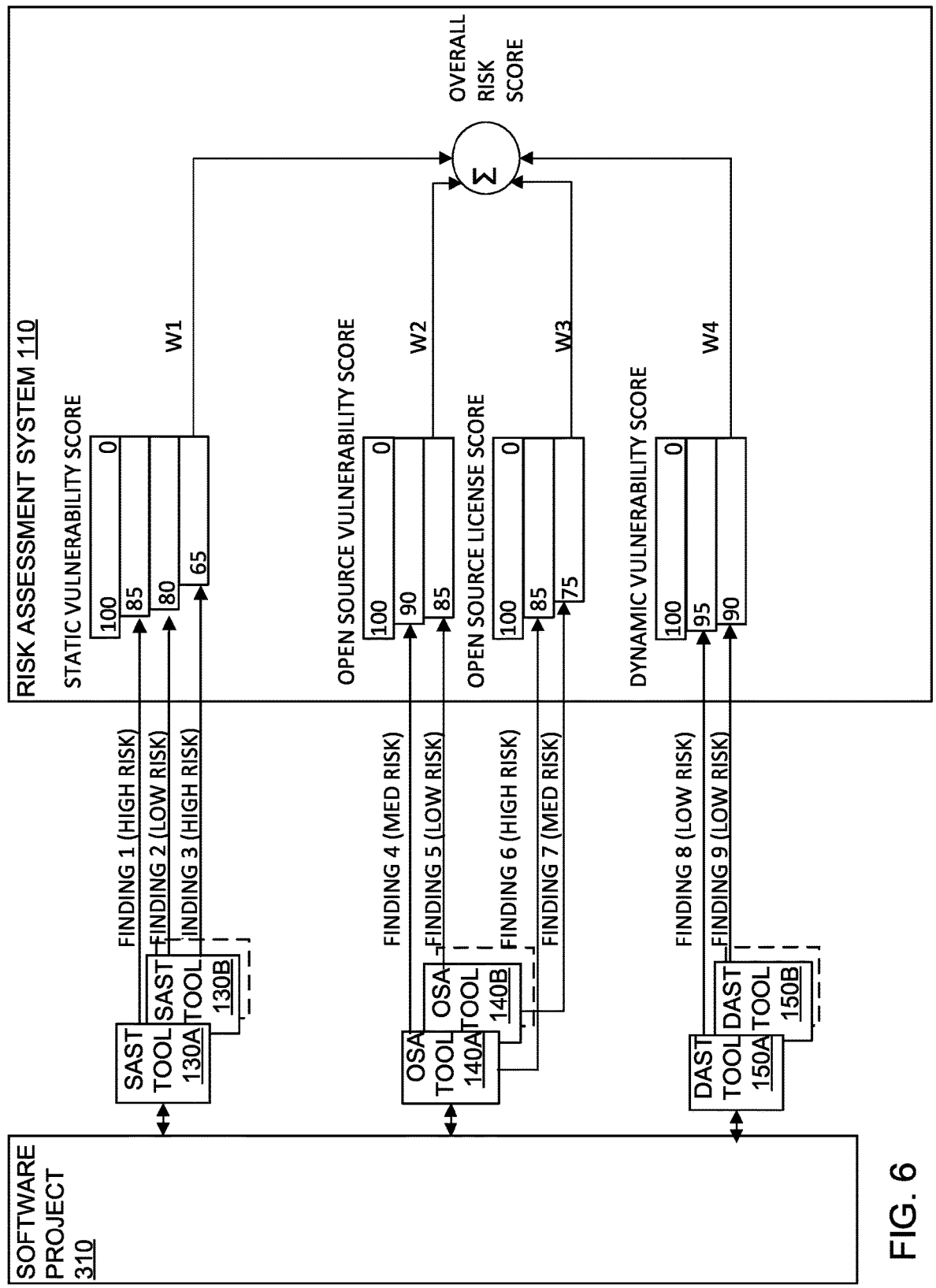
FIG. 6 is a fourth example block diagram illustrating a scoring process performed by the risk assessment system according to one aspect of the disclosed technology.

FIG. 6 illustrates an example of computing an overall risk score based on findings generated by SAST tools, OSA tools and DAST tools. Similar to FIG. 5, the risk assessment system 110 may compute a static vulnerability score based on findings generated by all SAST tools, compute an open source vulnerability score based on findings generated by all OSA tools, and compute an open source license score based on findings generated by all OSA tools. In addition, the risk assessment system 110 may compute a dynamic vulnerability score based on findings generated by all DAST tools, including DAST tools 150A-B. The dynamic vulnerability score may represent a combined dynamic analysis result. The risk assessment system 110 may assign weighting factors W1, W2, W3 and W4 to the static vulnerability score, the open source vulnerability score, the open source license score, and the dynamic vulnerability score, respectively. The risk assessment system 110 may compute an overall risk score by computing a weighted average of the static vulnerability score, the open source vulnerability score, the open source license score, and the dynamic vulnerability score.

Figure 7:
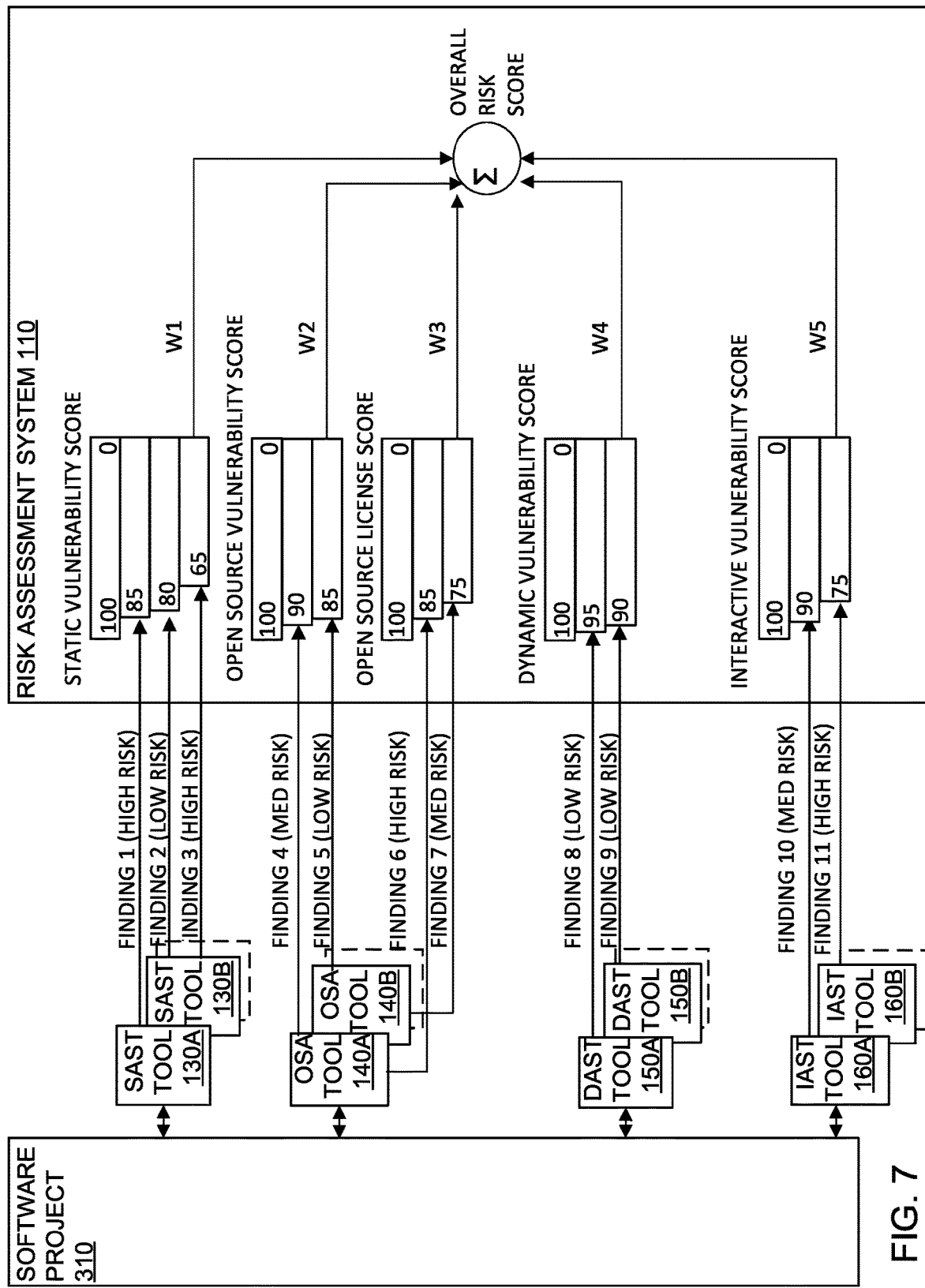
FIG. 7 is a fifth example block diagram illustrating a scoring process performed by the risk assessment system according to one aspect of the disclosed technology.

FIG. 7 illustrates an example of computing an overall risk score based on findings generated by SAST tools, OSA tools, DAST tools and IAST tools. Similar to FIG. 6, the risk assessment system 110 may compute a static vulnerability score based on findings generated by all SAST tools, compute an open source vulnerability score based on findings generated by all OSA tools, compute an open source license score based on findings generated by all OSA tools, and compute a dynamic vulnerability score based on findings generated by all DAST tools. In addition, the risk assessment system 110 may compute an interactive vulnerability score based on findings generated by all IAST tools, including IAST tools 160A-B. The interactive vulnerability score may represent a combined interactive analysis result. The risk assessment system 110 may assign weighting factors W1, W2, W3, W4 and W5 to the static vulnerability score, the open source vulnerability score, the open source license score, the dynamic vulnerability score, and the interactive vulnerability score respectively. The risk assessment system 110 may compute an overall risk score by computing a weighted average of the static vulnerability score, the open source vulnerability score, the open source license score, the dynamic vulnerability score, and the interactive vulnerability score.

All scores including the static vulnerability score, the open source vulnerability score, the open source license score, the dynamic vulnerability score, the interactive vulnerability score, and the overall score may be continuously updated as new tools perform scans on application code of the software project 310 to generate more findings, or existing tools perform subsequent scans on application code of the software project 310 in later scan sessions.

Figure 8:
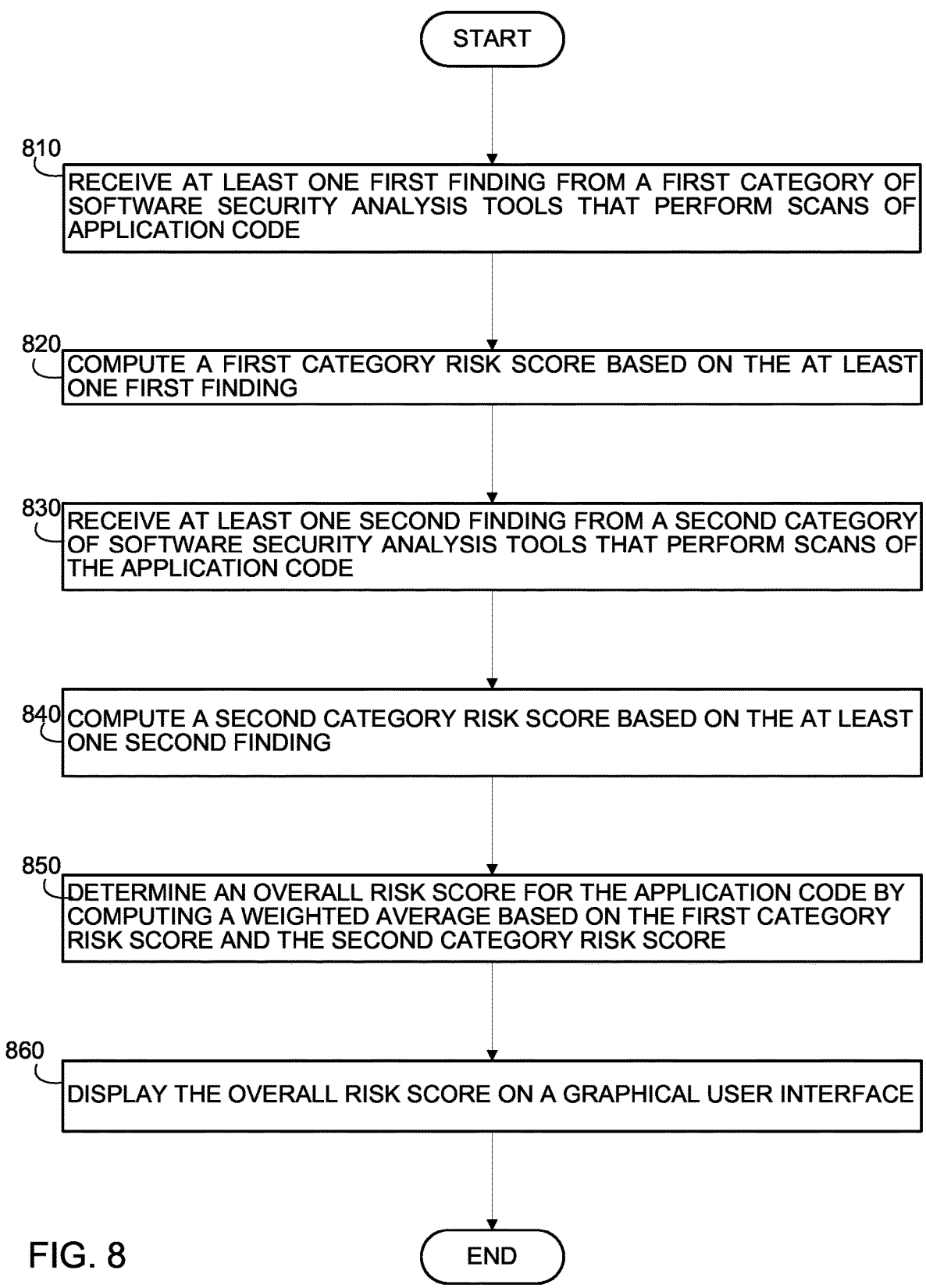
FIG. 8 is a first example flow chart of a scoring process performed by the risk assessment system according to one aspect of the disclosed technology.

FIG. 8 is an example flow chart of a scoring process performed by the risk assessment system 110. At 810, the processor 210 may receive at least one first finding from a first category of software security analysis tools 120 that perform scans on application code of a software project 310. At 820, the processor 210 may compute a first category risk score based on the at least one first finding. At 830, the processor 210 may receive at least one second finding from a second category of software security analysis tools 120 that perform scans on application code of the software project. The first software security analysis tool and the second software security analysis tool belong to at least one of the following categories: a first category for performing SAST, and a second category for performing OSA, a third category for performing DAST, and a fourth category for performing IAST. The first software security analysis tool and the second software security analysis tool may belong to different categories.

At 840, the processor 210 may compute a second category risk score based on the at least one second finding. The first category risk score and the second category risk score each distinctly represent one of the following: static vulnerability score, open source vulnerability score, open source license score, dynamic vulnerability score and interactive vulnerability score.

At 850, the processor 210 may determine an overall risk score for the application code of the software project by computing a weighted average based on the first category risk score and the second category risk score. At 860, the processor 210 may display the overall risk score on the graphical user interface 262.

In one embodiment, the processor 210 may be configured to receive at least one third finding from the second category of software security analysis tools. The processor 210 may compute a third category risk score based on the at least one third finding. The processor 210 may determine the overall risk score for the application code of the software project by computing the weighted average based on the first category risk score, the second category risk score and the third category risk score.

In one embodiment, the processor 210 may be configured to update the overall risk score for the application code of the software project over time based at least on one of the following: frequency of scan performed by each category of software security analysis tools, age of findings, and frequency of findings review.

In one embodiment, each finding may be associated with a risk level of a plurality of different risk levels. Each risk level may be associated with deduction points for computing the category risk score. Findings of the same risk level may have the same deduction points.

In one embodiment, at least one risk level may have a maximum deduction threshold, such that once the maximum deduction threshold is met, further findings of the same risk level are disregarded for computing the category risk score.

In one embodiment, the processor 210 may be configured to receive at least one fourth finding from the first category of software security analysis tools. The processor 210 may determine whether to update the first category risk score based on the fourth finding. The processor 210 may update the overall risk score when the first category risk score is updated.

In one embodiment, the fourth finding and the first finding may be generated by different software security analysis tools of the first category. For instance, the first category may be SAST tools. The fourth finding may be generated by Checkmarx™, whereas the first finding may be generated by Fortify™.

In one embodiment, the fourth finding and the first finding may be generated by the same software security analysis tool of the first category. For instance, both findings may be generated by Checkmarx™. These findings may be generated in different scan sessions or during the same scan session.

In one embodiment, the processor 210 may determine to maintain the first category risk score without update when the fourth finding duplicates the first finding.

In one embodiment, the processor 210 may determine to maintain the first category risk score without update when the fourth finding and the first finding are of the same risk level, and the maximum deduction threshold for that risk level has been met.

Figure 9:
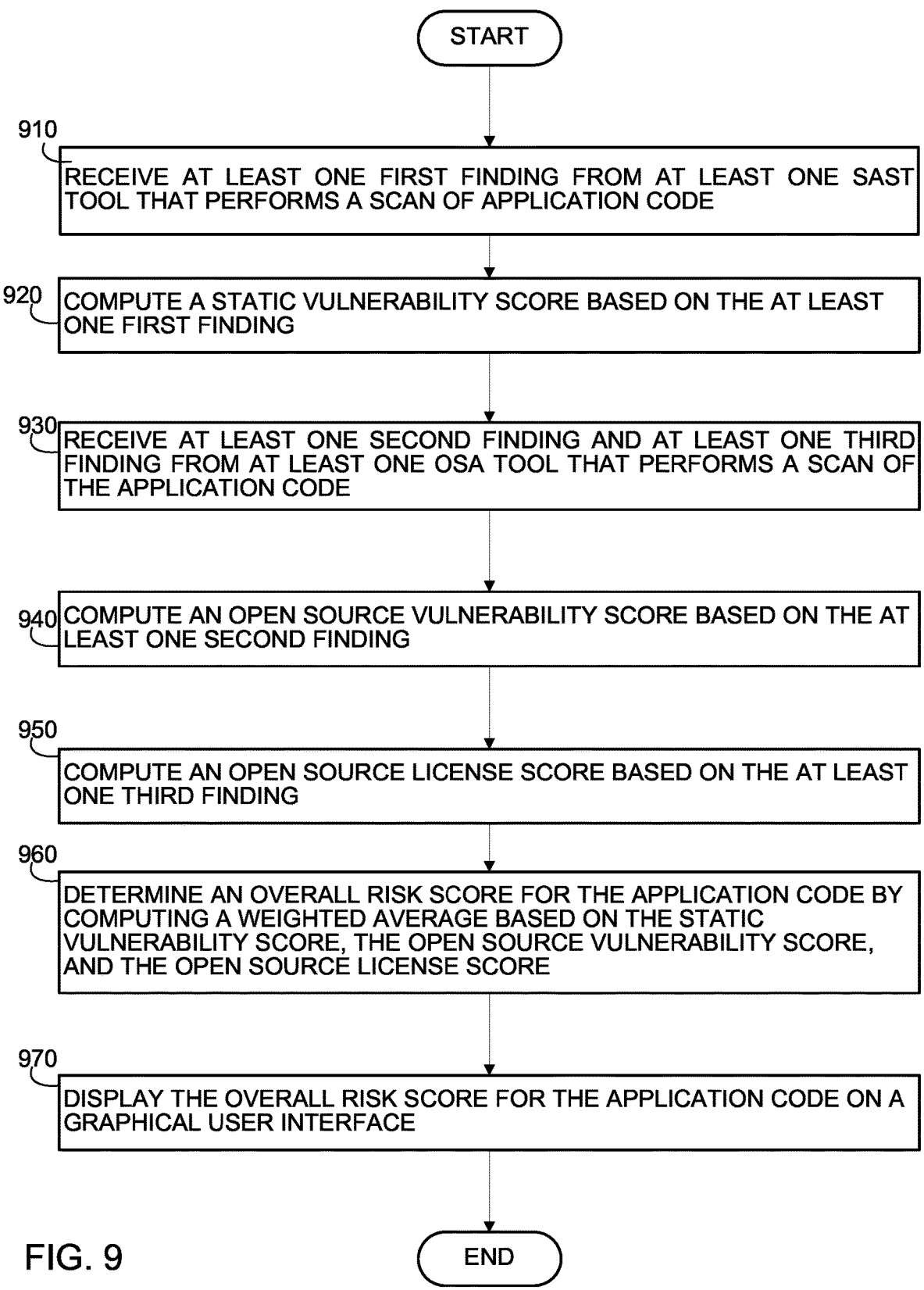
FIG. 9 is a second example flow chart of a scoring process performed by the risk assessment system according to one aspect of the disclosed technology.

FIG. 9 illustrates another example flow chart of a scoring process performed by the risk assessment system 110. At 910, the processor 210 may receive at least one first finding from at least one SAST tool 130 that performs a scan of application code of a software project 310. At 920, the processor 210 may compute a static vulnerability score based on the at least one first finding. At 930, the processor 210 may receive at least one second finding and at least one third finding from at least one OSA tool 140 that performs a scan of application code of the software project 310. At 940, the processor 210 may compute an open source vulnerability score based on the at least one second finding. At 950, the processor 210 may compute an open source license score based on the at least one third finding. At 960, the processor 210 may determine an overall risk score for the application code of the software project 310 by computing a weighted average based on the static vulnerability score, the open source vulnerability score, and the open source license score. At 970, the processor 210 may display the overall risk score for the application code of the software project on the graphical user interface 262.

Figure 10:
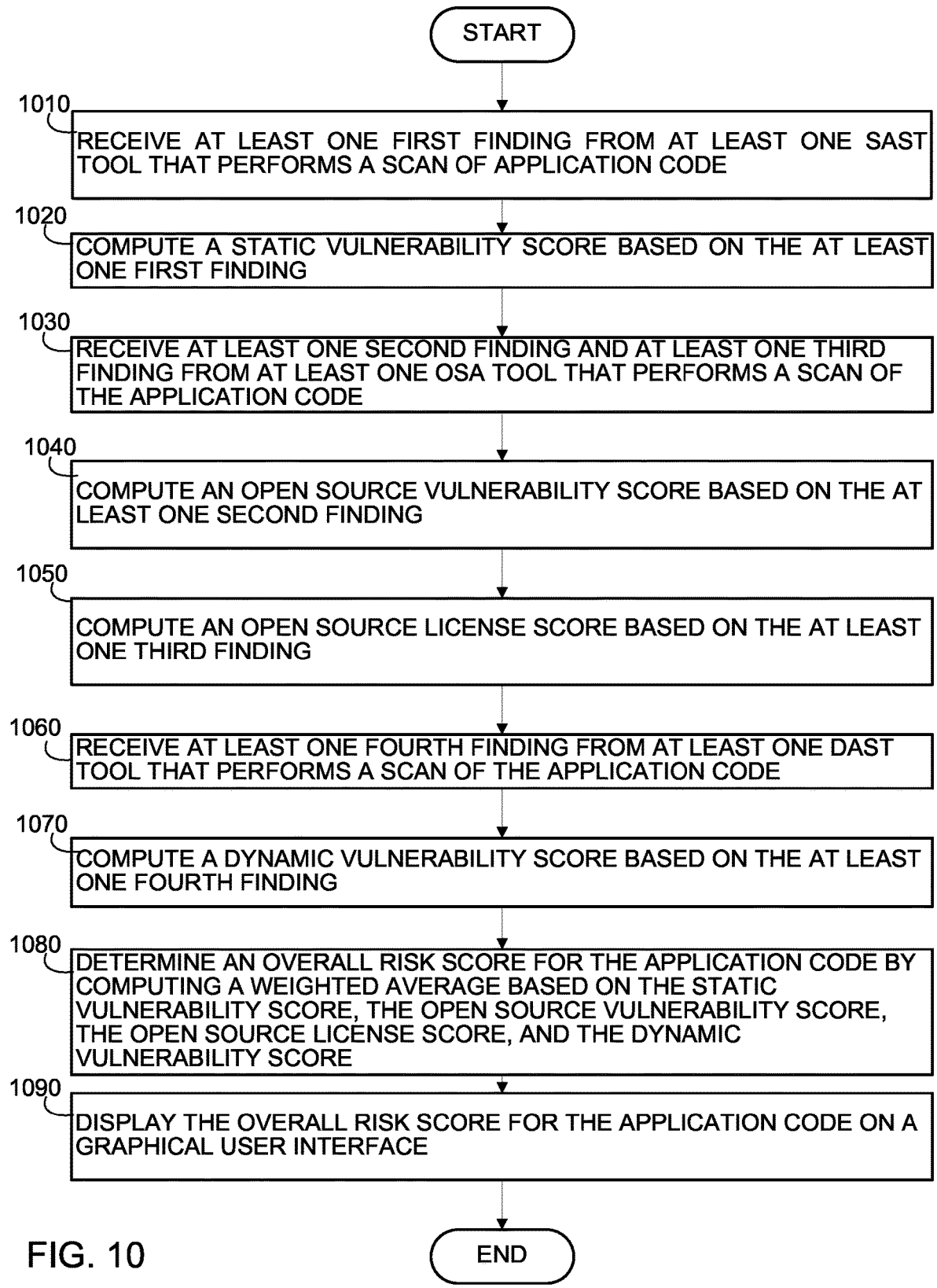
FIG. 10 is a third example flow chart of a scoring process performed by the risk assessment system according to one aspect of the disclosed technology.

FIG. 10 illustrates another example flow chart of a scoring process performed by the risk assessment system 110. At 1010, the processor 210 may receive at least one first finding from at least one SAST tool 120 that performs a scan of application code of a software project. At 1020, the processor 210 may compute a static vulnerability score based on the at least one first finding. At 1030, the processor 210 may receive at least one second finding and at least one third finding from at least one OSA tool 140 that performs a scan of application code of the software project. At 1040, the processor 210 may compute an open source vulnerability score based on the at least one second finding. At 1050, the processor 210 may compute an open source license score based on the at least one third finding. At 1060, the processor 210 may receive at least one fourth finding from at least one DAST tool 150 that performs a scan of application code of the software project. At 1070, the processor 210 may compute a dynamic vulnerability score based on the at least one fourth finding. At 1080, the processor 210 may determine an overall risk score for the application code of the software project 310 by computing a weighted average based on the static vulnerability score, the open source vulnerability score, the open source license score, and the dynamic vulnerability score. At 1090, the processor 210 may display the overall risk score for the application code of the software project on the graphical user interface 262.

As shown in FIG. 2, various users or interest groups, such as application owners, developers, lines of business, and executive stakeholders may use the risk assessment system 110.

In one example, the risk assessment system 110 may orchestrate the software security analysis tools 120. The risk assessment system 110 may interface with and collect information from various software security analysis tools 120 behind scenes. Acting as an abstraction layer on top of underlying interfaces for software security analysis tools 120, the risk assessment system 110 may orchestrate the software security analysis tools 120 by selectively activating their scan functions to scan application code of software projects, monitoring or tracking their scan activities throughout scan processes, and reviewing findings once scans are completed. The risk assessment system 110 may serve as a single interface or a single end-point between the user and software security analysis tools 120. By serving as a single interface to access scan results of software security analysis tool 120, the risk assessment system 110 may reduce complexity of integration and provide consistency when the user reviews scan results.

The risk assessment system 110 may trigger multiple software security analysis tools 120 of the same category to start scan simultaneously or at predetermined timestamps. For example, the risk assessment system 110 may instruct multiple SAST tools 130A-C to perform scan simultaneously or at predetermined timestamps. SAST tool 130A may be Checkmarx™ and SAST tool 130B may be Fortify™.

Also, the risk assessment system 110 may trigger one or more software security analysis tools 120 of different categories to start scan simultaneously or at predetermined timestamps. For example, the risk assessment system 110 may instruct multiple SAST tools 130A-B, and multiple OSA tools 140A-B to perform scan simultaneously or at predetermined timestamps. SAST tool 130A may be Checkmarx™, and SAST tool 130B may be Fortify™ OSA tool 140A may be WhiteSource™, and OSA tool 150B may be Blackduck™.

The risk assessment system 110 may trigger the same software security analysis tool 120, such as SAST tool 130A, to perform scan over scan at different timestamps or different scan sessions. SAST tool 130A may be Checkmarx™.

In one scenario, SAST tool 130A reports a finding that identifies a software issue that may need to be resolved to the risk assessment system 110. To validate whether the issue has been resolved, the risk assessment system 110 may not need to request the same SAST tool 130A to perform scan for a second time. Instead, the risk assessment system 110 may wait for remaining tools to complete their scans. Based on findings reported by the remaining tools, the risk assessment system 110 may determine that the software issue has been resolved, the risk assessment system 110 may update the aggregate scan result.

In one example, as shown in FIG. 2, the risk assessment system 110 may be plugged into one or more CI/CD tools 170 such that whenever code is checked in or a change is made to a particular software product, the risk assessment system 110 may automatically initiate one or more SAST tools 130A-C, one or more OSA tools 140A-C, one or more DAST tools 150A-C, or one or more IAST tools 160A-C to perform scan. Examples of the CI/CD tools 170 may include Jenkins™ and CircleCI™, among other possibilities.

In one example, the user may operate the risk assessment system 110 through one or more external collectors 180. The external collectors 180 may communicate with the API 270 of the risk assessment system 110. An example of the external collectors 180 may include Hygieia™, an open source DevOps dashboard for visualizing a development pipeline.

In one example, the risk assessment system 110 may rely on the graphical user interface 262 to interact with a user, such as receiving user inquiries, and providing information related to the software security analysis tools 120 and findings to the user.

In one example, when the risk assessment system 110 receives a scan request, for example, through the API 270, the risk assessment system 110 may automatically trigger one or more software security analysis tools 120 of the same or different categories to start scan. The request may include a minimum level of information needed to selectively activate scan functions on the software security analysis tools 120. In some embodiments, the minimum level of information may be determined based on the selection of security analysis tools 120 accessible to the risk assessment system 110, as well as other product or enterprise considerations. The minimum level of information required of a scan request may thus be abstracted from various requirements and parameters of the various security analysis tools, so as to provide an efficient interface for user interaction.

In one example, the scan request received by the risk assessment system 110 may include identification of code of a software project. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the risk assessment system 110 may send instructions to interfaces, such as APIs or command line utilities, of the various software security analysis tools 120. The various software security analysis tools 120 may be selectively determined based on the request and/or the code. Some software security analysis tools 120 may require extra information beyond the scope of the scan request to start execution, such as a line count and secondary language of the code. Although such extra information is not present (or requested of a user) in the scan request received by the risk assessment system 110, the risk assessment system 110 may independently determine and provide such extra information to the software security analysis tools 120, without user intervention.

Traditionally, when an organization wants to transition from one security tool to another, or swaps out one or more security tools, the organization may need to retool. Such efforts are saved by the risk assessment system 110. With the risk assessment system 110, backend tools may be added to or removed from the risk assessment system 110 in a process transparent to the user or internal customer of the organization.

Each tool 120 may have a different interface or protocol. For example, SAST tools 130A-C, OSA tools 140A-C, DAST tools 150A-C, and IAST tools 160A-C may have interfaces 232A-C, 242A-C, 252A-C and 262A-C, respectively. These tools may have different types of interfaces, including RESTful API, SOAP API, and a command line utility among other possibilities. Traditionally, the user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the risk assessment system 110 of the example embodiments, the user is no longer involved with constructing requests or parameters required by the individual protocols of each tool. By dealing with the risk assessment system 110 alone, the user does not need to learn protocols of each software security analysis tool 120 and does not need to deal with separate interfaces such as APIs or command lines.

The risk assessment system 110 may initiate scan activities on multiple software security analysis tools 120, and monitor scan activities performed by each tool from start to completion. As each software security analysis tool 120 completes its scan activity, the risk assessment system 110 may receive its findings, store the received findings in the non-transitory computer readable medium 220, and wait for remaining software security analysis tools 120 to complete scans. The non-transitory computer readable medium 220 may store historical information associated with scan activity performed by each software security analysis tool 120, including but not limited to historical developments of findings.

Each software security analysis tool 120 may have a vendor-established taxonomy. Findings reported by each software security analysis tool 120 may be in a vendor-provided format. The vendor-provided format may be XML, JSON, or other structured format.

In some example embodiments, the risk assessment system 110 may not rely on or expressly adopt any given taxonomy. For example, the risk assessment system 110 may not rely on CWE or vendor-established taxonomies. Instead, an example risk assessment system 110 may have a unique internal standardized taxonomy that reconciles findings generated by different software security analysis tools 120. The standardized taxonomy may be managed or defined by a dynamic classification system of names and categories. As a result, regardless of their vendor-provided formats, the risk assessment system 110 may normalize each finding to a standardized taxonomy, for instance, by performing mappings to corresponding names and categories in the classification system. The classification system may be dynamically maintained such that any new name or category revealed by any new finding may be dynamically added to the classification system.

For each finding, the risk assessment system 110 may normalize the finding to the standardized taxonomy. For instance, the risk assessment system 110 may normalize findings generated by the first tool 120A in the format of XML to the standardized taxonomy. The risk assessment system 110 may normalize findings generated by the second tool 120B in the format of JSON to the standardized taxonomy.

The risk assessment system 110 may determine a fingerprint that represents each normalized finding. Each fingerprint may be determined based on at least one of the following: CWE, framework alignment, code detail, and name, among other possibilities. The code detail may include line number and code content.

The non-transitory computer readable medium 220 may store historical findings 224 generated by each software security analysis tool 120. For instance, the non-transitory computer readable medium 220 may store normalized findings. Each normalized finding may be identifiable by the fingerprint. The non-transitory computer readable medium 220 may store information of historical updates of each normalized finding for display in the graphical user interface 262 upon request.

The risk assessment system 110 may deduplicate findings and aggregate findings that are generated by the software security analysis tools 120. The risk assessment system 110 may perform de-duplication of the findings provided by different tools 120. For instance, if findings returned by same or different tools 120 reveal the same software issue in the same software project, then the risk assessment system 110 may eliminate duplicate findings. If findings returned by same or different tools 120 represent developments or updates over time on the same software issue in the same software project, the risk assessment system 110 may track historical updates on the same software issue and make such information readily available to the user upon request.

The risk assessment system 110 may rely on fingerprints to determine correlation or similarity among findings generated by different software security analysis tools 120. The fingerprint approach may be associated with line position, contents, CWE and other identifying factors, to determine whether two findings produced by two different software security analysis tools 120 are the same. The fingerprint approach remains robust regardless whether the code position, line or content changes in subsequent scans.

For example, for each normalized finding, the risk assessment system 110 may determine a fingerprint that identifies the normalized finding. The risk assessment system 110 may collect or organize one or more of the following meta information or metadata surrounding each finding to form its fingerprint: associated CWE information, framework alignment, code details, and any identifying factor, among other possibilities. Framework alignment may include Web Application Security Consortium (WASC), and Open Web Application Security Project (OWASP) Top 10, among other possibilities. Code details may include line numbers and contents, among other possibilities.

The risk assessment system 110 may use the fingerprint to determine whether a finding is unique. For this purpose, the risk assessment system 110 may implement an algorithm that identifies partial or full matches of fingerprints. For instance, the risk assessment system 110 may use a threshold of similarity to determine partial matches of fingerprints.

The algorithm may tolerate differences in code line numbers or code contents. The algorithm may de-duplicate findings generated by different software security analysis tools 120. The algorithm may also de-duplicate findings generated by the same software security analysis tools 120, scan over scan, as attributes change.

To determine whether two findings are identical or relevant to each other, the risk assessment system 110 may compare their respective fingerprints. If two fingerprints at least partially match each other, their respective findings may be identical or related to each other. If two findings are identical, the risk assessment system 110 may eliminate one finding to avoid duplication of findings. If two findings are related to each other, they may represent historical developments of the same software issue, such that one finding represents an update relative to the other finding. Updates may include a line number change, or line content change, among other possibilities. The risk assessment system 110 may track such historical developments or updates of same software issues.

To determine if there is any match or partial match among findings, the risk assessment system 110 may compare the fingerprints. The risk assessment system 110 may store distinct findings in the non-transitory computer readable medium 220. For any new finding received by the risk assessment system 110, after normalization, the risk assessment system 110 may determine whether the same finding has already existed in the medium 220 by comparing the new fingerprint that identifies the new finding with fingerprints that identify existing findings already stored in the medium 220.

If the new fingerprint for the new finding fails to at least match any fingerprint for existing findings stored in the medium 220, the risk assessment system may add the new finding to the medium 220. If the new fingerprint at least partially matches a fingerprint for an existing finding, the risk assessment system 110 may determine if the new finding contains any update with respect to the existing finding. If no update, the risk assessment system 110 may discard the new finding. If there is an update, the risk assessment system 110 may update the medium 220 to include the update.

Each risk assessment system 110 may include one or more physical or logical devices (e.g., servers). For example, the risk assessment system 110 may be a single device or server or may be configured as a distributed computer system including multiple servers, devices, or computers that interoperate to perform one or more of the processes and functionalities associated with the disclosed embodiments. In some embodiments, the risk assessment system 110 may further include a peripheral interface, a transceiver, a mobile network interface in communication with the processor 210, a bus configured to facilitate communication between the various components of the risk assessment system 110, and a power source configured to power one or more components of the risk assessment system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, and ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 224. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the risk assessment system 110. For example, the risk assessment system 110 may access one or more remote programs 226, that, when executed, perform functions related to disclosed embodiments.

The risk assessment system 110 may also include one or more I/O devices 260 that may comprise one or more interfaces for receiving signals or input from devices and providing signals or output to one or more devices that allow data to be received and/or transmitted by the risk assessment system 110. For example, the risk assessment system 110 may include interface components, which may provide interfaces to one or more input devices, such as one or more keyboards, mouse devices, touch screens, track pads, trackballs, scroll wheels, digital cameras, microphones, sensors, and the like, that enable the risk assessment system 110 to receive data from one or more users. The risk assessment system 110 may include a display, a screen, a touchpad, or the like for displaying images, videos, data, or other information. The I/O devices 260 may include the graphical user interface 262.

In exemplary embodiments of the disclosed technology, the risk assessment system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 190 may include a network of interconnected computing devices more commonly referred to as the internet. The network 190 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 190 may comprise any type of computer networking arrangement used to exchange data. For example, the network 190 may be the Internet, a private data network, virtual private network using a public network, and/or other suitable connection(s) that enables components in system environment 100 to send and receive information between the components of system 100. The network 190 may also include a public switched telephone network ("PSTN") and/or a wireless network. The network 190 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 192 may host websites, web portal or software application, data or software applications that may access and interact with the risk assessment system 110. A website may be an internal page/site associated with an enterprise, or a publicly accessible website.

Exemplary Use Cases

The following example use case describes examples of implementations of the risk assessment system 110. This is intended solely for explanatory purposes and not limitation.

Figure 11:
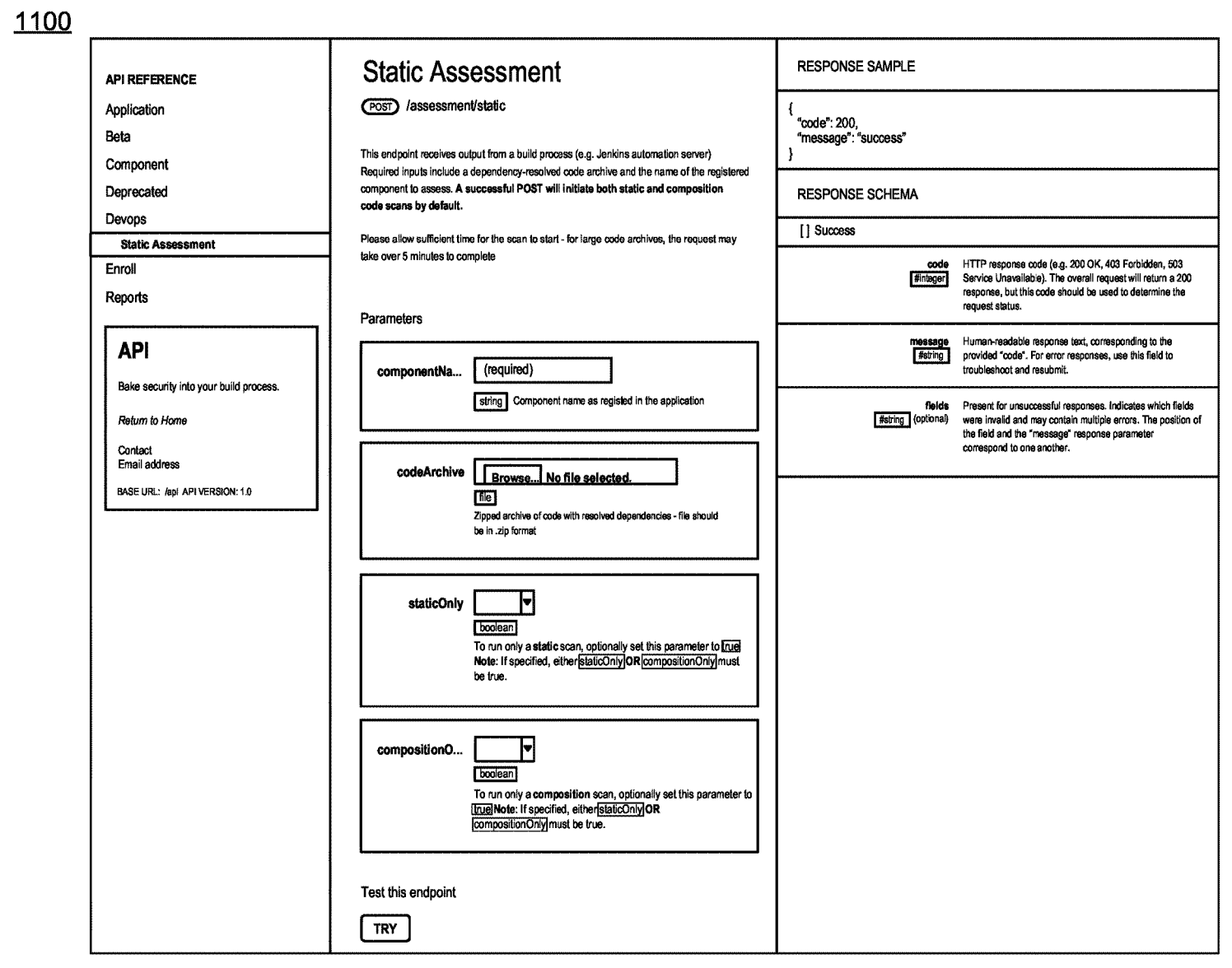

FIG. 11 illustrates a screenshot 1100 for operating the risk assessment system 110 to perform SAST scans and OSA scans of application code. As shown in FIG. 11, by sending a request to the pictured "/assessment/static" endpoint, back-end scans may be orchestrated for all (or a subset of) enabled SAST tools 130 such as Fortify on Demand™ and Checkmarx™, and all enabled OSA tools 140 such as WhiteSource™. The simplified interface shown in the screenshot 1100 has two required inputs and two optional inputs (the remaining parameters and configurations etc. being handled automatically by the risk assessment system 110), significantly lower than most individual tool integrations. The risk assessment system 110 handles the rest of the required integration with various tools 120 behind the scenes, the required and optional inputs having been abstracted out for ease of use of the user.

Figure 12:
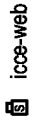
FIG. 12 is another example screenshot of the graphical user interface of the risk assessment system according to one aspect of the disclosed technology.

FIG. 12 illustrates a screenshot 1200 of the graphical user interface 262 of the risk assessment system 110, according to an example implementation. FIG. 12 illustrates a few elements of the orchestration process. The screenshot 1200 depicts a view in the risk assessment system 110 for a given software project or application showing its scan history. As shown, events may be shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may be Checkmarx™, tool B may be Fortify on Demand™, and tool C may be WhiteSource™. Lastly, an additional request, listed as "Queued," is on hold until the scans that are currently in progress have completed.

The risk assessment system 110 monitors scan statuses of all tools 120 from start to completion. Once all scans of an assessment have completed, the assessment is marked as "Completed." Upon assessment completion, individual scan results of each tool 120 may be combined into a unified finding view and presented by the risk assessment system 110.

The screenshot 1200 also shows the ability for admins to configure specific scanners. This may be automatically done as components are enrolled, but can be overridden by admins. As shown in FIG. 12, next to that configuration, category risk scores are shown. This set of three scores are outcomes of most recent scan results. The first category risk score is a static vulnerability score that represents a combined static analysis result. The second category risk score is an open source license score that represents a combined open source license analysis. The third category risk score is an open source vulnerability score that represents open source known vulnerabilities.

Figure 13:
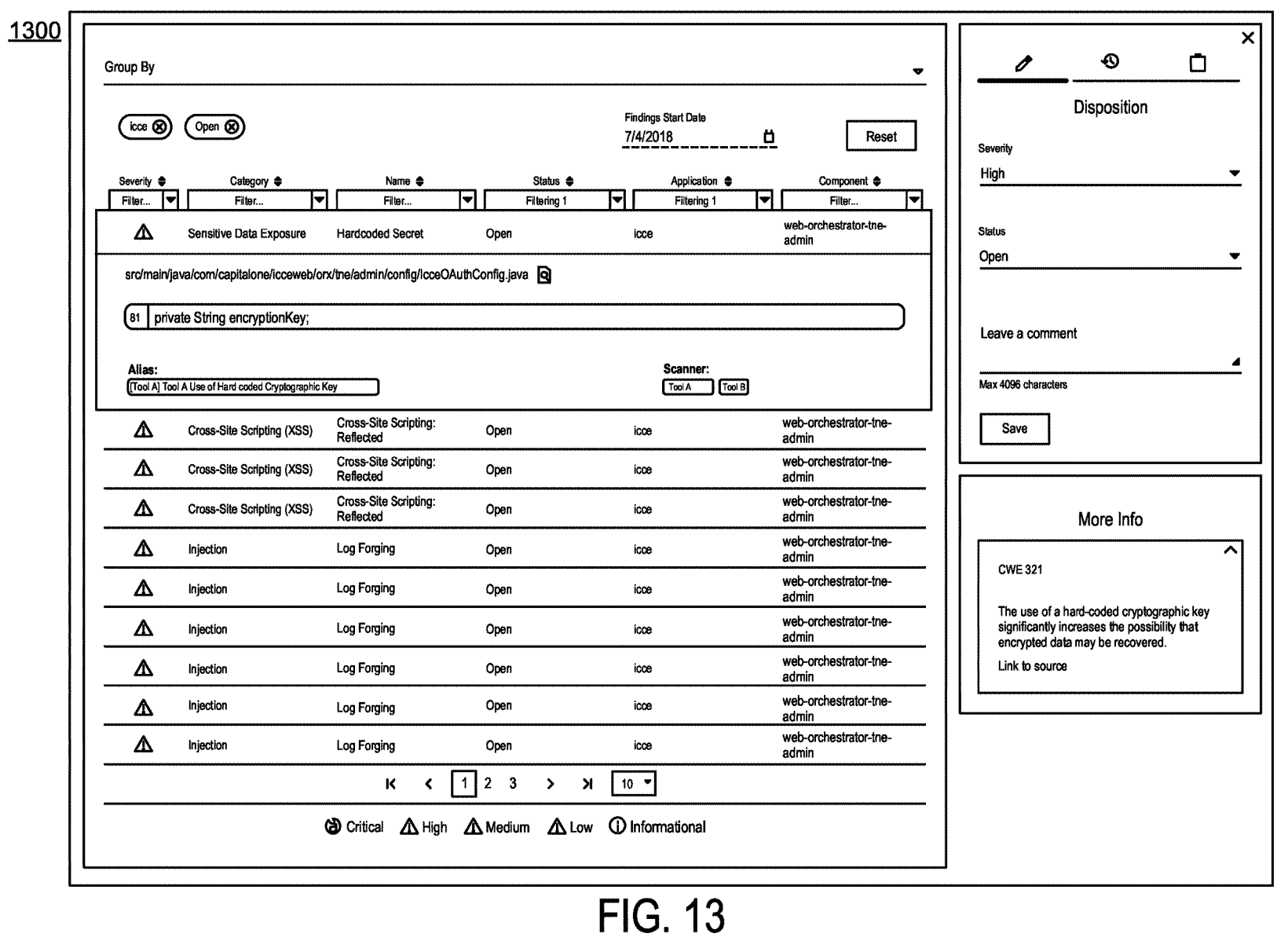

FIG. 13 illustrates a screenshot 1300 of the example graphical user interface 262 of the risk assessment system 110, according to an example implementation. The screenshot 1300 shows findings after each scan has finished. These findings are an aggregate scan result of multiple software security analysis tools 120. As shown in the screenshot 1300, the first finding (e.g., a sensitive data exposure—hardcoded secret) was found by both two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. After each tool yield its finding, the risk assessment system 110 may through its de-duplication process determine that findings provided by each tool in fact refer to the same issue. Instead of creating separate records for the same issue, the risk assessment system 110 may consolidate the findings by different tools as a single finding, as shown in the example of the first finding in FIG. 13.

The risk assessment system 110 may unify various common fields, such as severity, category, and name to common internal taxonomy, rather than relying on CWE or some other external way to link them. The screenshot 1300 illustrates a disposition side-bar where users may dispose findings, where disposition is handled across tools and across assessments/scans.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assessing software risks, comprising:
receiving a first security analysis finding for a first portion of application code from a first software security analysis tool in a first category;
computing a first category risk score based on the first security analysis finding;
receiving a second security analysis finding for the first portion of application code from a second software security analysis tool in a second category;
computing a second category risk score based on the second security analysis finding;
normalizing the first security analysis finding and the second security analysis finding to a standardized taxonomy, the first security analysis finding and the second security analysis finding being in a vendor-provided format;
determining an overall risk score for the first portion of application code based at least in part on the first category risk score; and
displaying the overall risk score on a graphical user interface.

2. The method of claim 1, wherein the first category and the second category are chosen from a plurality of categories comprising:
a category for performing Static Application Security Testing (SAST);

a category for performing Open Source Analysis (OSA);
a category for performing Dynamic Application Security Testing (DAST); and
a category for performing Interactive Application Security Testing (IAST).

3. The method of claim 1, wherein the first category risk score obtained from a first deduction of points from a first default value of the first category risk score, the first deduction of points corresponding to the first security analysis finding, and the second category risk score obtained from a second deduction of points from a second default value of the second category risk score, the second deduction of points corresponding to the second security analysis finding.

4. The method of claim 3, further comprising determining that each of the first deduction of points and the second deduction of points exceeds a maximum deduction threshold.

5. The method of claim 1, further comprising:
receiving a third security analysis finding for the first portion of application code from a third software security analysis tool in the second category;
computing a third category risk score based on the third security analysis finding; and
determining the overall risk score for the first portion of application code based on the first category risk score, the second category risk score, and the third category risk score.

6. The method of claim 1, further comprising:
determining the overall risk score with the standardized taxonomy;
wherein the first software security analysis tool and the second software security analysis tool are from a first vendor and a second vendor, respectively.

7. The method of claim 1, further comprising:
storing, in historical scan data, the first security analysis finding with the first category risk score and a first timestamp at which the first security analysis finding was received;
storing, in the historical scan data, the second security analysis finding with the second category risk score and a second timestamp at which the second security analysis finding was received; and
displaying, on the graphical user interface, the historical scan data with the overall risk score.

8. A method for assessing software risks, comprising:
receiving a first security analysis finding for a first portion of application code from a first software security analysis tool in a first category, the first security analysis finding having a first deduction value;
computing a first category risk score based on the first deduction value by deducting the first deduction value from a first default value of the first category risk score;
assigning a first risk level to the first category risk score based on the first deduction value;
receiving a second security analysis finding for the first portion of application code from a second software security analysis tool in a second category, the second security analysis finding having a second deduction value;
computing a second category risk score based on the second deduction value by deducting the second deduction value from a second default value of the second category risk score;
assigning a second risk level to the second category risk score based on the second deduction value;
determining that each of the first deduction of points and the second deduction of points exceeds a maximum deduction threshold;
and
determining an overall risk score for the first portion of application code based at least in part on the first category risk score.

9. The method of claim 8, wherein the first category risk score and the second category risk score comprises one of a static vulnerability score, an open source vulnerability score, an open source license score, a dynamic vulnerability score; or an interactive vulnerability score.

10. The method of claim 8, further comprising:
receiving a third security analysis finding for the first portion of application code from a third software security analysis tool in the second category, the third security analysis finding having a third deduction value;
computing a third category risk score based on the third deduction value by deducting the third deduction value from a third default value of the third category risk score;
assigning a third risk level to the third category risk score based on the third deduction value;
aggregating the third risk level with the first risk level and the second risk level to obtain an overall risk level; and
determining the overall risk score for the first portion of application code based on the first category risk score, the second category risk score, and the third category risk score.

11. The method of claim 8, further comprising:
receiving the first security analysis finding and the second security analysis finding in a vendor-provided format;
normalizing the first security analysis finding and the second security analysis finding to a standardized taxonomy; and
determining the overall risk score with the standardized taxonomy;
wherein the first software security analysis tool and the second software security analysis tool are from a first vendor and a second vendor, respectively.

12. The method of claim 8, further comprising:
storing, in historical scan data, the first security analysis finding with the first category risk score and a first timestamp at which the first security analysis finding was received;
storing, in the historical scan data, the second security analysis finding with the second category risk score and a second timestamp at which the second security analysis finding was received; and
displaying, on a graphical user interface, the historical scan data with the overall risk score.

13. The method of claim 12, further comprising:
determining that the first timestamp and the second timestamp are older than a predetermined time; and
increasing the first deduction value and the second deduction value.

14. The method of claim 13, further comprising:
rescanning the first portion of application code to update the first security analysis finding, the updating comprising overwriting the first timestamp;
rescanning the first portion of application code to update the second security analysis finding, the updating comprising overwriting the first timestamp;
decreasing the first deduction value and the second deduction value; and updating the first risk level and the second risk level based on the first deduction value and the second deduction value, respectively.

15. A method for assessing software risks, comprising:
receiving a first security analysis finding for a first portion of application code from a Static Application Security Testing (SAST) tool;
computing a static vulnerability score based on the first security analysis finding;
receiving a second security analysis finding and a third security analysis finding for a first portion of application code from an Open Source Analysis (OSA) tool;
computing an open source vulnerability score based on the second security analysis finding;
computing an open source license score based on the third security analysis finding;
determining an overall risk score for the first portion of application code based at least in part on the static vulnerability score and the open source vulnerability score; and
displaying the overall risk score for the application code on a graphical user interface.

16. The method of claim 15, further comprising:
receiving the first security analysis finding and the second security analysis finding in a vendor-provided format;
normalizing the first security analysis finding and the second security analysis finding to a standardized taxonomy; and
determining the overall risk score with the standardized taxonomy;
wherein the SAST tool and the OSA tool are from a first vendor and a second vendor, respectively.

17. The method of claim 15, further comprising:
storing, in historical scan data, the first security analysis finding with the static vulnerability score and a first timestamp at which the first security analysis finding was received;
storing, in the historical scan data, the second security analysis finding with the open source vulnerability score and a second timestamp at which the second security analysis finding was received; and
displaying, on the graphical user interface, the historical scan data with the overall risk score.

18. The method of claim 17, further comprising:
determining that the first timestamp and the second timestamp are older than a predetermined time;
scanning the first portion of application code to update the first security analysis finding, the updating comprising overwriting the first timestamp; and
scanning the first portion of application code to update the second security analysis finding, the updating comprising overwriting the first timestamp.

19. The method of claim 15, further comprising:
receiving a fourth security analysis finding for the first portion of application code from a Dynamic Application Security Testing (DAST) tool;
computing a dynamic vulnerability score based on the fourth security analysis finding, the dynamic vulnerability score obtained from a fourth deduction of points from a fourth default value of the dynamic vulnerability score, the fourth deduction of points corresponding to the fourth security analysis finding;
determining that the fourth deduction of points does not exceed the maximum deduction threshold; and
updating the overall risk score for the first portion of application code based on the static vulnerability score, the open source vulnerability score, and the dynamic vulnerability score.

20. The method of claim 19, wherein the static vulnerability score obtained from a first deduction of points from a first default value of the static vulnerability score, the first deduction of points corresponding to the first security analysis finding, the open source vulnerability score obtained from a second deduction of points from a second default value of the open source vulnerability score, the second deduction of points corresponding to the second security analysis finding, and the open source license score obtained from a third deduction of points from a third default value of the open source license score, the third deduction of points corresponding to the third security analysis finding, and
wherein the computing comprises determining that each of the second deduction of points and the third deduction of points exceeds a maximum deduction threshold.

* * * * *